INVENTOR
K. W. PFLEGER
BY Harry C. Hart
ATTORNEY

INVENTOR
K. W. PFLEGER
BY Harry C. Hart
ATTORNEY

Aug. 26, 1952 K. W. PFLEGER 2,608,616

FACSIMILE SYSTEM

Filed Nov. 13, 1946 4 Sheets-Sheet 3

INVENTOR
K. W. PFLEGER
BY Harry C. Hart
ATTORNEY

Aug. 26, 1952 K. W. PFLEGER 2,608,616

FACSIMILE SYSTEM

Filed Nov. 13, 1946 4 Sheets-Sheet 4

INVENTOR
K. W. PFLEGER
BY Harry C. Hart
ATTORNEY

Patented Aug. 26, 1952 2,608,616

UNITED STATES PATENT OFFICE 2,608,616

FACSIMILE SYSTEM

Kenneth W. Pfleger, Arlington, N. J., assignor to Bell Telephone Laboratories, Incorporated, New York, N. Y., a corporation of New York Application November 13, 1946, Serial No. 709,576

24 Claims. (Cl. 178—6)

This invention relates to signaling and particularly to apparatus for facsimile transmission.

When printed, typewritten, or handwritten matter, drawings, or other two-tone subject-matter or copy is transmitted from point to point by means of a telephotograph system of the usual type set up for half tone operation, full use is not made of the ability of the system to transmit reliably a relatively large range of signal amplitude values. Nor is advantage taken of certain characteristics of ordinary two-tone subject-matter to effect economies in the number of signal elements required to be transmitted for faithful reproduction. Reference is here made, first to the fact that, in all two-tone subject-matter, the copy areas encountered by a scanning element traveling along any path may be regarded as occurring in pairs, a light area following each dark area, and vice versa; and, second, to the fact that areas of one character, for example, the light areas, usually far outnumber the areas of the other character, for example, the dark areas.

An object of this invention is to increase the transmission rate of two-tone subject-matter or copy over any channel by utilizing the special characteristics of such subject-matter to the best advantage.

Another object is to increase the transmission rate of two-tone subject-matter or copy over an ordinary transmission channel by effecting a more equal distribution between band width requirements and amplitude discrimination requirements than is customary whereby the rate of transmission over a channel capable of handling a range of amplitude greater than necessary to transmit signals derived from the scanning of such copy by conventional methods may be increased.

In accordance with one feature of the invention the signaling speed or transmission rate is increased by analyzing the copy in a fashion to produce conventional image signals and to derive therefrom an intermediate sequence of signal elements each of which corresponds, not to a dark area nor to a light area nor to the transition between them, but to an adjacent pair of areas of unrestricted length, of which one is a light area and the other is a dark area. This results in a reduction to substantially one half of its conventional value the number of different signal elements which must be transmitted in a given time for faithful reproduction of the copy, even with copy which is, on the average, one half light and one half dark.

It is necessary, however, to distinguish, in the copy analysis, between the different kinds of area pairs, and in transmission and reproduction between the signal elements which represent the different kinds of pairs. Otherwise the reproduction would merely be of alternating light and dark areas of like configuration. Thus, for example, a pair consisting of a short dark area followed by a short light area must be distinguished from a pair consisting of a short dark area followed by a long light area.

In accordance with a further feature of the invention this distinction is effected by establishing a relation between the character of the copy area pair, i. e., its "long dark-short light" or "long light-short dark" etc., character, and some suitable characteristic of the signal element which represents it. Thus the length of one member of the area pair, for example the dark member, may be related to the amplitude of the signal element which represents the pair. Still further flexibility is achieved in one embodiment, by causing successive signal elements to alternate in polarity, as well as differing in magnitude.

The utilization of differences in magnitude and in sign or polarity of signals, to carry information, in addition to differences in duration, is well known in the telegraph art. Cardwell Patent 801,967 and Deardorff Patent 1,614,546, among others, contain such teachings. Various proposals have also been made to derive signaling economies from the characteristics of particular types of transmissible copy. For example, Gray Patent 2,138,577 teaches the transmission of signals related to the transitions or discontinuities between dark areas and light areas, instead of signals related to these areas themselves, and Watson et al. Patent 1,602,469 teaches the use of a dual signal having a primary component representative of the occurrence of a picture element and an auxiliary component indicative of the length or spatial extent of the picture element and controlling the duration of the primary component. Again, various means have been proposed for effecting economies by temporary signal storage prior to transmission. Baird Patent 1,945,626 is representative of a large class of such suggestions.

The present invention differs from the suggestions of the prior art in various features and relations. Among these differences are the novel relations which it establishes between copy areas and signal elements, which relations offer marked advantages in the increase of signaling speed. The invention differs also in the organization of the apparatus elements employed for establishing these relations at the transmitter and for reconstructing the copy, at the receiver, from signals in which these relations have been established.

The invention will be more fully understood from the following detailed description of preferred embodiments thereof taken in conjunction with the appended drawings, in which.

Figures 1, 2, 3, 4:
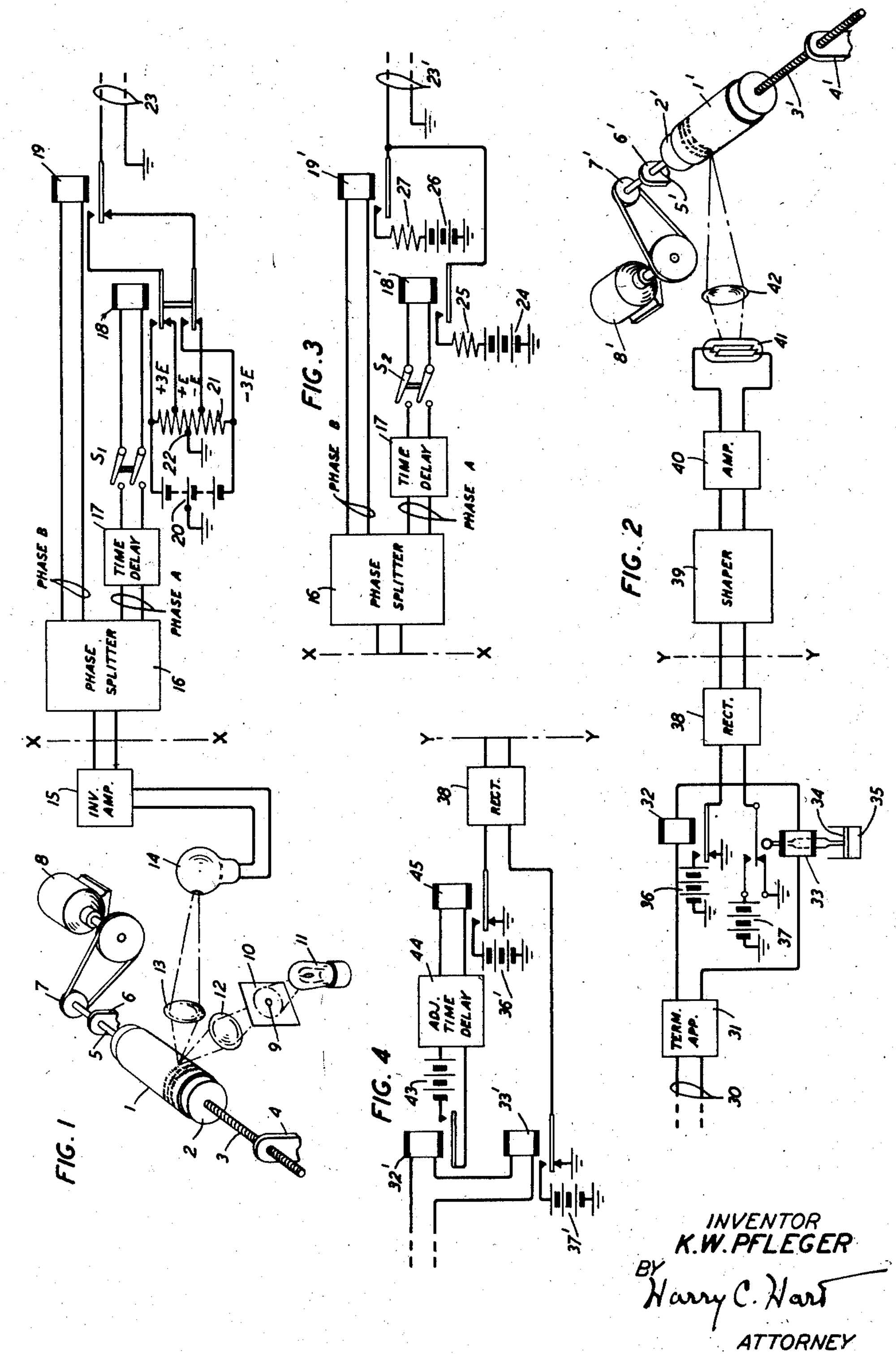
Fig. 1 is a schematic diagram of analyzer and transmitter apparatus in a facsimile transmission system in accordance with the invention.
Fig. 2 is a schematic diagram of receiver apparatus adapted to reconstitute copy analyzed and transmitted by the apparatus of Fig. 1.
Fig. 3 is a schematic diagram of a modification of a part of the apparatus of Fig. 1, to the right of the lines X—X.
Fig. 4 is a schematic diagram of a modification of a part of the apparatus of Fig. 2, to the left of the lines Y—Y.

Referring now to Fig. 1, the left-hand portion of this figure shows, in highly simplified form, a system for deriving a sequence of conventional image signals from copy to be transmitted, i. e., signals which are directly proportional in magnitude and duration to the light and dark areas of the copy. The copy 1 to be transmitted, which is preferably of such a kind that the lengths of the dark areas along any scanning line are equal or nearly equal, may be wrapped around a drum 2 and held in place by conventional means such as spring clips, not shown. The drum 2 is arranged for rotation about its axis and for advancement parallel with its axis, either continuous or intermittent, an arrangement for continuous advancement being shown in the drawing because of its simplicity. Thus the drum 2 is mounted on a coaxial mandrel, one extended end 3 of which is threaded. The threads engage with a threaded bushing 4. The other end 5 of the mandrel turns freely in another bushing 6. Any suitable means, here schematically indicated by a pulley 7, driven by a motor 8, may be employed for simultaneously driving the drum in rotation and in axial advancement.

Figure 5:
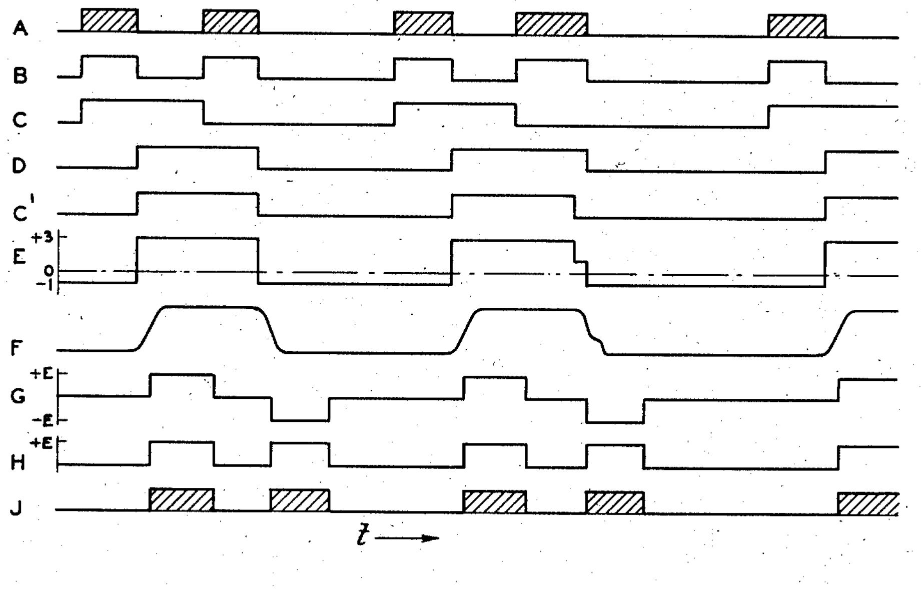
Fig. 5 is a diagram showing the development of a signal by the apparatus of Fig. 1 into special form and the reconstruction therefrom of a copy signal by the apparatus of Fig. 2.

A small region of the drum is brightly illuminated as by an aperture 9 in a screen 10 floodlighted by a lamp 11, which aperture is focussed onto the surface of the drum by a lens 12. This illuminated part of the drum is in turn focussed by a second lens 13 onto the light sensitive portion of a photoelectric cell 14. As the drum, bearing the copy to be transmitted, revolves, the illuminated area scans the copy 1 and the photoelectric cell 14 thus receives light which is proportional to the light and dark value or "density" of that portion of the copy 1 which is instantaneously illuminated. In accordance with known principles, the photoelectric cell 14 then delivers an electric signal of conventional form, directly proportional to the instantaneous light values of the copy. This signal may now be inverted, in known fashion, to provide a signal whose amplitudes are directly proportional to the copy density; i. e., maximum signal amplitude corresponds to black copy. Referring to Fig. 5, curve A represents the light and dark values of adjacent areas of the copy taken along a particular scanning line, and curve B represents the resulting inverted photoelectric cell signal. This signal may be in an actual case of less perfect definition than is indicated by curve B. As long as the distortion is not too severe, it is of no importance. If it should be excessive, a shaping circuit of a type well known in the art may be employed to restore it, with or without a small and unimportant time delay, substantially to the form indicated by curve B.

This signal may now be brought to a suitable power level as by an amplifier 15, which may also include the inversion feature above referred to, and applied to the analyzing apparatus of the invention.

In accordance with a first modification of the invention the signal is first fed through a so-called "phase splitting" circuit 16 which derives from it two different signals (curve C and curve D of Fig. 5), and sends them out on two different paths or lines, indicated in Fig. 1 as "phase A" and "phase B." In the phase A line, the outgoing signal (curve C) commences at the first positive transition of the curve B signal and terminates at the next positive transition. In the phase B line, the outgoing signal (curve D) commences at the first negative transition of the curve B signal and terminates at the next negative transition. The phase A signal recommences at the third and ensuing odd-numbered positive transitions of the curve B signal, and terminates on the even ones. The phase B signal recommences at the third and ensuing odd-numbered negative transitions and terminates on the even ones.

The phase splitter circuit 16 itself may be any arrangement or system which accomplishes the above-described transformation of the B signal into the C and D signals. A circuit arrangement which is preferred is described in United States Patent 1,670,376 to Harry Nyquist. Briefly, this circuit arrangement is a network of polarized relays, each of which is so designed that its movable contact remains on whichever one of its two fixed contacts it is resting when its winding is deenergized. These relays, when interconnected in the manner described in the aforesaid Nyquist patent, produce the following sequence of operations, when the circuit arrangement is energized by the curve B signal, i. e., by the amplified and inverted output from the photoelectric cell:

First dark area—energizes phase A.
Light area thereafter—energizes phase B.
Second dark area—deenergizes phase A.
Light area thereafter—deenergizes phase B.

Thus two cycles of the photoelectric cell current, curve B, produce only one cycle of the signal current in each of phases A and B, which constitute the output of the phase splitting network. Examination of curves C and D of Fig. 5 will reveal that the signals on phases A and B are characterized in the following ways: First, each signal on phase A commences with a dark area of the scanned copy, while each signal on phase B commences with the following light area.

Second, they differ in duration only to the comparatively slight extent that one copy area pair, commencing with a dark area, differs from another copy pair which commences with a light area. Third, the signals of phase B commence later than those of phase A by a time corresponding, for a given scanning speed, with the length measured along the scanning path, of a single dark copy area. Thus curve D of Fig. 5 is displaced, on the drawing, to the right of curve C by substantially the width of one dark signal of curve B.

In accordance with the invention, the phase A signals are next delayed with respect to the phase B signals by a time equal to their original time displacement, so as to bring them into substantial coincidence. This signal delay may be accomplished by the use of apparatus of any desired type, schematically indicated in the drawing by the block 17. Evidently the current in the A phase at the output terminals of this device may now be represented by the curve C′ of Fig. 5.

In accordance with the invention, the delayed A phase signals and the undelayed B phase signals are combined to form a composite signal, suitable for economical transmission. The combination may be effected in various ways. One way is to supply the two signals to be combined to two relays, one 18 of which alters only the magnitude of an outgoing line signal while the other 19 alters only its polarity. (For the present the switch $S_1$, to be described below, is to be considered closed.) Various means may be resorted to, to accomplish this result, a simple one being shown in the drawing wherein a voltage source such as a battery 20, supplies a voltage of six units to a potentiometer 21 whose mid-point 22 is grounded, taps being connected to the potentiometer at the points whose voltages, measured from ground or zero, are, respectively, −3E, −E, +E and +3E. The A phase relay 18 has four fixed contacts and two movable tongues which are mechanically arranged for synchronous movement, the fixed contacts being connected in the manner shown to the potentiometer taps. The movable tongues are connected to the upper and lower fixed contacts, respectively, of the B phase relay 19 which may be a simple device having two fixed contacts and one movable tongue, which latter may be connected to one terminal of a transmission line 23 whose other terminal is connected to ground.

With the tongues of both relays 18, 19 in the positions shown, these relays are deenergized, and the outgoing signal voltage applied to the transmission line 23 is −E. If the B phase relay 19 were alone energized, its tongue would move to the opposite fixed contact and the line voltage would be changed to +E. If instead the A phase relay 18 were alone energized, both of its tongues would move to their opposite contacts, the upper one alone of the lower pair of contacts being effective, and the line voltage would be −3E. If both of the relays were energized together, all contacts would move upward and the line voltage would be +3E.

As above stated the A phase signals have been delayed with respect to the B phase signals by an amount such that, for the most part, their transitions occur together. Thus the signals which are applied to the transmission line are depicted in the curve E of Fig. 5. They consist, for the most part, of either +3E or −E, the remaining amplitude values of +E and −3E occurring only on occasions when the copy 1 departs from the preferred form in which all dark areas are of equal length, no restriction being placed on the length of any light area. Such a condition appears in the second signal group of curve E, and is due to the fact that the fourth dark area of curve A is longer than the others. Thus, on the average, the number of transitions between signal elements of the intermediate signal sequence on the transmission line has been substantially reduced. Even if the transmission line 23 should fail to transmit correctly the signals of amplitude values +E and −3E, the results would be merely a degradation of the quality of the reproduced copy which would generally be tolerable and not render it illegible. However, for optimum results, it is recommended that the copy employed be of the preferred type, in which every dark area is of substantially the same length as every other dark area.

Another system by which the delayed A phase signals may be combined with the undelayed B phase signals to form composite signals suitable for transmission in accordance with the invention operates by simple arithmetical addition. This result may be secured by means of adding circuits of various sorts, the one shown in Fig. 3 being representative. Here the delayed A phase signal actuates one relay 18′ and the undelayed B phase signal actuates another relay 19′. Each relay comprises a single fixed contact and a movable tongue. The fixed contact of one relay 18′ is connected to a source of substantially constant current, for example, a source of electromotive force 24 in series with a comparatively high resistor 25. The fixed contact of the other relay 19′ is similarly connected to a constant current source comprising a source of electromotive force 26 and a high resistor 27. The two movable tongues are connected together and to one side of the outgoing transmission line 23′. The other side of the transmission line 23′ may be connected to ground.

In operation, the switch $S_2$ being closed, a signal on the B phase operates the relay 19′ and current of a specified value, for example, unit current, enters the transmission line 23′. Similarly a signal on the A phase operates the other relay 18′ which likewise delivers unit current to the transmission line 23′. When there is no signal on either the A phase or on the B phase, neither relay is operated and zero current is delivered to the transmission line. When signals appear on both the A phase and the B phase simultaneously, both relays are operated simultaneously and two units of current are delivered to the transmission line.

When this arrangement is employed, the simultaneous presence of impulses in both phases, graphically represented by the coexistence of current in the C′ curve and the D curve, gives the largest composite signal, for example, two current units, and the absence of both gives the smallest, for example zero current. Thus with copy of the preferred form, the outgoing line signal has at all times one or other of two easily distinguishable values, while the intermediate signal values occur only when the copy departs from this preferred form. Curve E of Fig. 5 represents this condition if the indicated current values +3 and −1, as well as the zero current axis, be ignored.

The intermediate signal sequence (curve E) which is thus generated is now transmitted to receiver apparatus located at a distant point by any suitable transmission channel, schematically indicated on Figs. 1 and 3 by the conductors 23 and 23', respectively.

At the receiver station, the signal as received may be degraded in the sense that its transitions are less sharp than the transitions of curve E, this degradation taking place by reason of the characteristics of the transmission line and associated terminal apparatus. The signal may have characteristics approximately as indicated in curve F of Fig. 5. Despite certain degradation of the sharpness of its transitions, it nevertheless retains the fundamental character of the signal of curve E.

If desired, the degradation may be removed by any suitable type of signal shaping circuit. Many and various circuit arrangements and devices for squaring up the transitions of transmitted signals are known in the art. Patent 1,315,539 to J. R. Carson, Patent 2,202,629 to C. W. Hansell and Patent 2,345,881 to Harry Nyquist are representative of various types of such arrangements. Even though the degradation due to transmission over the channel be considerably greater than that indicated by the change from curve E to curve F, the use of such a shaping circuit will restore the signal substantially to the form of curve E, slightly delayed however. The use of such a shaping circuit is, however, only a refinement, and with degradation no more serious than that indicated, such refinement is unnecessary.

Turning now to the receiver apparatus indicated in Fig. 2, the received intermediate signal sequence (curve E or F of Fig. 5, depending upon whether or not this signal has been degraded without being reshaped), appears at the receiver terminals 30 of the transmission line. It may be amplified or modified in character as desired, by the use of terminal apparatus 31. It is then applied to two translation devices such as relays 32, 33, each of which has two fixed contacts and one movable tongue. The relays may be alike except for the fact that movement of the tongue of one relay 33 is delayed with respect to movement of the other tongue by any desired means, for example, the tongue of the slow-acting relay 33 may be mechanically linked to a paddle 34 which moves in an oil bath; i. e., it may be coupled with a dash-pot 35. The lower contacts of these two relays are connected to ground, and the upper contact of each relay is connected to the positive terminal of a battery 36, 37 whose negative terminal is connected to ground. The tongues of these two relays are connected by way of a rectifier 38, a pulse shaper 39 and an amplifier 40 to a current controlled light source, schematically indicated by a lamp 41. The light of the lamps 41, when illuminated, is focussed by a lens 42 onto a small element of the surface of a reproducer drum 2' which may be identical with the drum 2 at the transmitter and may be similarly moved both rotationally and axially, this movement being preferably suitably coordinated with that at the transmitter by synchronizing circuits or devices which are not shown but which are well known in the art. Parts of this receiver apparatus which correspond with similar transmitter parts are indicated by like reference numerals, distinguished by primes.

In operation, as the signal F (or E) arrives at the receiver apparatus, both of the relays 32 and 33 are energized simultaneously. The upper relay 32 operates substantially instantaneously and the lower relay 33 having not yet operated, the voltage E of the battery 36 is applied to the rectifier 38 which delivers a signal which after amplification and shaping, if necessary, energizes the lamp 41 which brightly illuminates a small area of the rotating receiver drum 2'. The drum may have wrapped around it an unexposed sheet of photographically sensitive paper 1' or film which is exposed at a particular part of its surface by the light from the lamp 41. After a brief interval, however, the tongue of the lower relay 33 moves upward and places the same voltage E on the lower terminal of the rectifier 38. This reduces the voltage input to the rectifier to zero, and the lamp 41 is extinguished. This takes place after a delay determined by the design and adjustment of the dash-pot 35 which is preferably made substantially equal to the time required to scan across a single dark copy area.

At the next transition of the signal F (or E) i. e., at the first negative transition, the relays are both deenergized and the tongue of the upper relay 32 moves to its lower contact. The tongue of the lower relay 33 remains against the upper contact until the expiration of the delay period determined by the setting of the dash-pot 35, whereupon the lower relay tongue moves to its lower fixed contact. During the interim of the delay a negative voltage E will have been applied to the input terminals of the rectifier 38, returning to zero value at the expiration of the delay. By reason of the characteristic of the rectifier, here assumed to be a "full-wave rectifier," the signal delivered to the lamp 41 and therefore the illumination of the sensitive paper 1' will be the same for a negative rectifier input signal as it is for a positive rectifier input signal. This rectifier 38 may be of any desired type, for example, a relay network adapted to deliver signals of one polarity when actuated either by positive or by negative signals. If the shaper, amplifier, and exposure lamp respond alike to positive and negative signals, the rectifier may be dispensed with.

Referring again to Fig. 5, the curve G shows the signal output from the relay circuit and the signal input to the rectifier 38. It rises to a value +E upon the arrival of the signal and falls to zero after the specified time delay, then increases negatively to the value −E at the first negative transition of the signal curve E or curve F of Fig. 5 returning again to zero after the expiration of the specified time delay. The curve H represents the output of the rectifier, which is identical with the curve G except for a reversal of the polarity of all the negative signals. The curve J, in turn, which is directly proportional at all points to the curve H, represents the resulting photographic exposure of the sensitized paper 1'. Inspection will show that this curve J is identical with the curve A which represented the light and dark values of the copy to be transmitted except for a time delay consisting of two parts, first a delay deliberately introduced by the time delay device 17 in the A phase channel at the transmitter and substantially equal to the time required to scan a single dark area of the copy; and a minor delay due to the sum total of delays in the transmission line and the receiver apparatus.

As is well known, such delays are unimportant because they represent merely a displacement of the reconstituted copy in position on the drum and not a degradation of its quality.

If desired, for example in order to attain greater precision and temperature independence in the operation of the receiver apparatus time delay, an electrical network for producing this delay may be resorted to and the dash-pot 35 may be dispensed with. Fig. 4 shows such a system which is designed to replace that portion of the circuit arrangement of Fig. 2 which lies to the left of the line Y—Y. Thus the incoming signal (curves E or F of Fig. 5) simultaneously energizes two relays 32' and 33' whose tongues therefore move from one fixed contact to the other substantially instantaneously. Upward movement of the tongue of the lower relay 33' places a voltage E from the battery 37' on the lower input terminal of the rectifier 38 and downward movement of this tongue grounds this terminal. Upward movement of the tongue of the upper relay 32' applies a signal due to a battery 43 to the input terminals of an adjustable time delay network 44 and downward movement of this tongue removes this signal. The output terminals of the delay network 44 are connected to a third relay 45 of which the lower fixed contact is connected to ground, the upper fixed contact to the positive terminal of a battery 36', and the movable tongue to the upper input terminal of the rectifier.

In operation, as is evident from a glance at the circuit, the initial positive transition of the incoming signal (curve E or F of Fig. 5) causes simultaneous operation of the first two relays 32' and 33'. Operation of the lower relay 33' immediately places a voltage E on the lower terminal of the rectifier 38 and, since its upper terminal is grounded, causes illumination of the lamp 41 as above described and exposure of the photographically sensitive paper 1' at a certain position. Simultaneous operation of the upper relay 32' energizes the delay network 44 and after the lapse of a preassigned time delay, the third relay 45 is energized. Its tongue then moves upward and ground is removed from the upper terminal of the rectifier 38 which is connected instead to the battery 36' thus reducing the input voltage of the rectifier 38 to zero and extinguishing the lamp 41. The two single-tongue relays 32' and 33' may be replaced by a single two-tongue four-contact relay, like the relay 18 of Fig. 1, if desired.

As is well known, electrical and acoustic delay networks can be constructed to operate with high precision and with constancy under various conditions of temperature and humidity. Thus the extinguishing of the exposure lamp 41 may be caused to take effect at an instant which occurs with great exactness after a specified time delay commencing with the illumination of the lamp.

It will be understood by those skilled in the art that adjustment of the time delay produces a corresponding variation in the length of the reproduced dark areas only and therefore results in flexibility and variation, as distinguished from degradation, of the reproduction. For example light face type may be reproduced as bold face or Clarendon type or vice versa, merely by adjustment of the delay time of the network 44.

Returning now to consideration of the apparatus at the transmitter, it will be understood that the more nearly the copy to be transmitted meets the standards of the preferred form, that is, the more nearly equal in length are all the dark areas of the copy, the more nearly do the A phase relay and the B phase relay in the transmitter apparatus operate in synchronism, being energized or deenergized, as the case may be, at the same instant. This is the case whether the signal polarity reversing relay arrangement of Fig. 1 be employed or whether the simpler current adding arrangement of Fig. 3 be employed instead. In either case, when both relays operate in synchronism, neither one adds substantially to the information content of the signal derived from the other. Therefore, and at the sacrifice of a small amount of quality in the reproduced copy due to failure to distinguish between dark areas of standard length and dark areas which are slightly longer or shorter than the standard length, the apparatus may be greatly simplified and one or other member of the transmitter relay pair may be dispensed with. For example, in Fig. 1 the entire A phase equipment, including the time delay device 17 and the associated four-terminal two-tongue relay 18 may be dispensed with. Similarly in the apparatus of Fig. 3 the A phase equipment including the time delay device 17 and the associated relay 18' may be dispensed with. In each case this permits simplification of the phase splitter apparatus 16 by omission of the elements which control the currents of the A phase. In either case the remaining relay 19 or 19' may be arranged to be energized and deenergized successively upon successive occurrences of a transition of a preassigned polarity in the curve B signal. That is to say, the remaining relay may be arranged to produce as an outgoing signal on the transmission line 23 an intermediate sequence of signals which are related to the B curve signals either in the manner of the C curve or in the manner of the D curve. In either case the final outgoing signal will resemble, in wave form, the signal of the E curve at all points except the final portion of the second signal group at which the relays did not operate in synchronism.

Thus, employing the characteristics of copy of the preferred form to the best advantage results, not only in a saving of signaling speed, but also in an economy of apparatus.

The apparatus of Figs. 1 and 3 may if desired be constructed to operate in either manner. With the switches $S_1$ or $S_2$ closed, they operate as first described above. Opening the switches $S_1$ or $S_2$ disables the A phase equipment and operation takes place as last described above.

Figure 7:
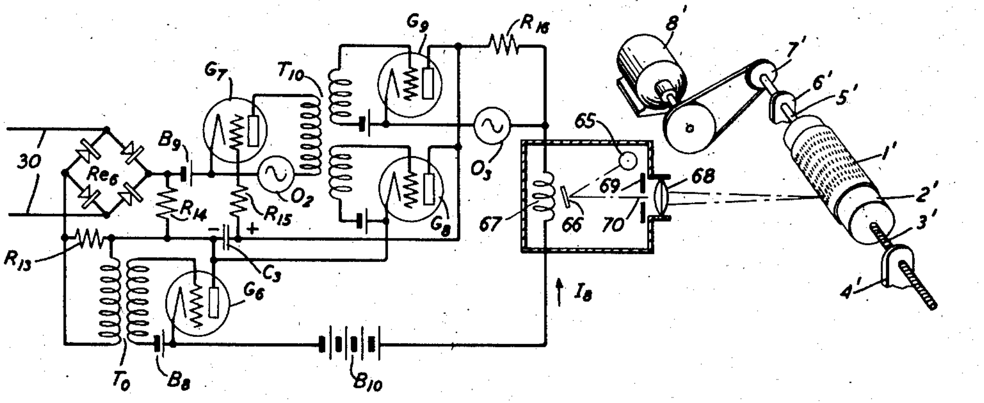
Fig. 7 is a schematic diagram of receiver apparatus adapted to reconstitute copy analyzed and transmitted by the apparatus of Fig. 6.
Figure 6:
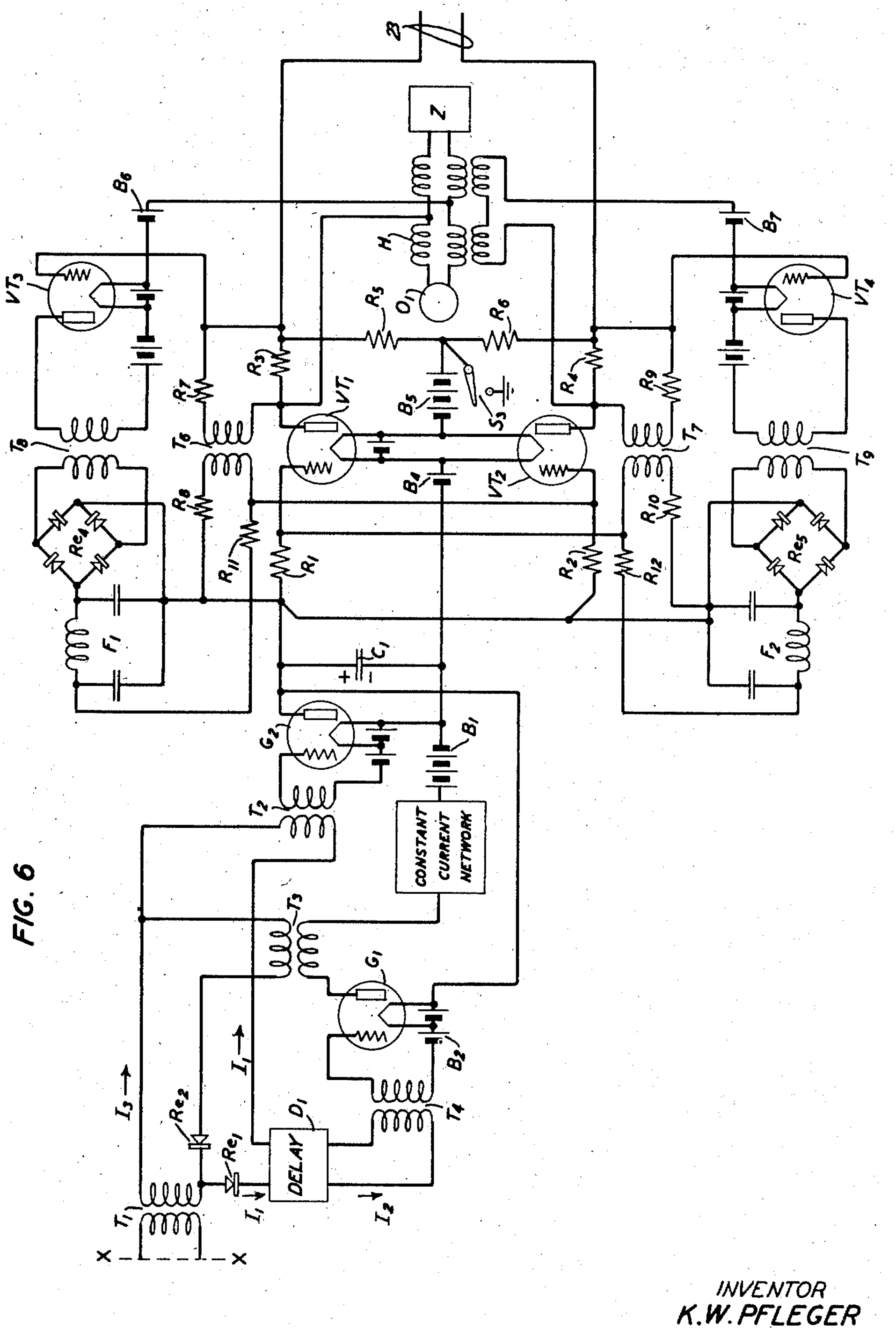
Fig. 6 is a schematic diagram of analyzer and transmitter apparatus organized in accordance with another embodiment of the invention.
Figure 8:
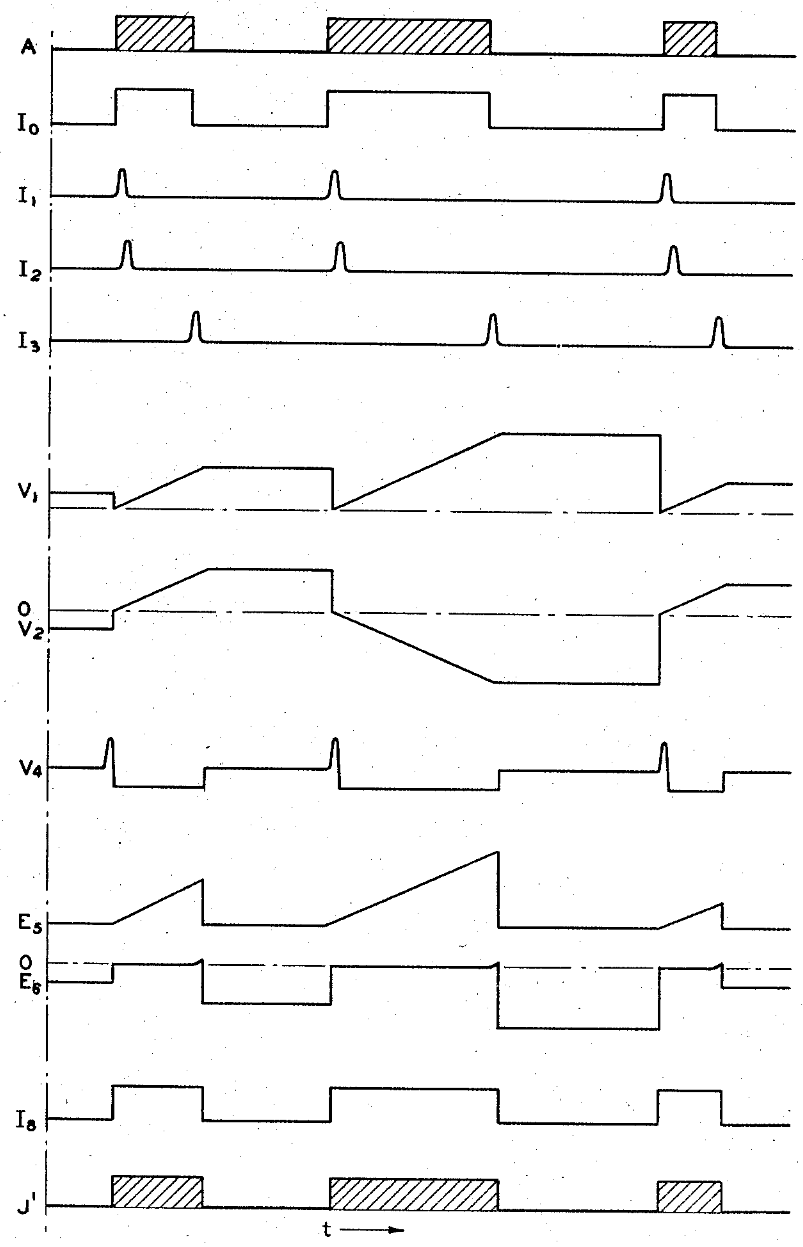
Fig. 8 is a diagram showing the development of a signal by the apparatus of Fig. 6 into special form for economical transmission and the reconstitution therefrom of a copy signal by the apparatus of Fig. 7.

Another modification of the invention, employing similar though not identical principles and utilizing a similar though not an identical sequence of operations, is illustrated for the transmitter apparatus in Fig. 6 and for the receiver apparatus in Fig. 7, the sequence of signal current transformations between the original copy at the transmitter and its reproduction at the receiver being diagrammatically illustrated in Fig. 8. For illustrative reasons, the apparatus of Figs. 6 and 7 is shown as being constructed of components which are mainly electronic in nature. As will be understood by those skilled in the art, electromechanical relays may be substituted as desired or as may be found convenient for these electronic components, just as electronic components may in turn be substituted for the electromechanical relays of Figs. 1, 2, 3 and 4.

Referring now in detail to Fig. 6, the light source, scanning drum, photoelectric cell and associated apparatus may be identical with those of Fig. 1 and may operate in a similar way to that hereinabove described, to produce at the section X—X of Figs. 1 and 6 an initial current of conventional form whose amplitude is proportional both in magnitude and in duration to the successive dark and light areas of the copy to be transmitted. This relationship is illustrated in curves A and $I_0$ of Fig. 8, wherein curve A represents the light and dark values of a part of a scanning line of the copy to be transmitted and the curve $I_0$ represents the resulting image signal. This signal is now applied to the analyzing apparatus of Fig. 6 to produce signals for point to point transmission whose transitions occur much more slowly than those of the curves A and $I_0$.

Thus this conventional image signal, designated $I_0$, enters the primary winding of a repeating coil or transformer $T_1$. The latter, by virtue of its well-known characteristic, transmits only negative or positive impulses of current corresponding, respectively, to the light-to-dark transitions and the dark-to-light transitions of the scanned copy. Two separate secondary circuits are connected to the secondary winding of the transformer $T_1$ of which the first includes rectifier $Re_1$, the input terminals of a delay device $D_1$ and the primary winding of a transformer $T_2$. The other secondary circuit of the transformer $T_1$ includes the primary winding of a transformer $T_3$ and a rectifier $Re_2$.

The output of the delay device $D_1$ is coupled by way of a transformer $T_4$ to the control grid of a gas tube $G_1$ whose cutoff condition may be adjusted by proper selection of its grid bias battery $B_2$ in well-known fashion. The anode of this gas tube $G_1$ may be connected by way of the secondary winding of the transformer $T_3$, a network $N_1$ to be described hereinafter and a source of anode voltage $B_1$ to the cathode of another gas tube $G_2$ and the "negative" terminal of a condenser $C_1$. The "positive" terminal of the condenser $C_1$ is connected to the anode of the gas tube $G_2$ and also, by way of resistors $R_1$ and $R_2$, to the control grids of two vacuum tubes $VT_1$ and $VT_2$ whose cathodes may be connected together and by way of a bias battery $B_4$ to the cathode of the tube $G_2$. The input circuits of the tubes $VT_1$ and $VT_2$ are thus in parallel, from the standpoint of a signal arriving from the condenser $C_1$. The anode circuits of tubes $VT_1$ and $VT_2$ will be described in further detail hereinafter.

In the operation of the circuit as thus far described, upon arrival of the first positive transition of the conventional image signal $I_0$, a positive pulse is applied simultaneously to both secondary circuits of the transformer $T_1$. However, the rectifier $Re_2$ prevents the flow of current in the second circuit due to this positive pulse, whereas the rectifier $Re_1$ permits the flow of current $I_1$ which, in turn, results in the application of a positive pulse to the control grid of the gas tube $G_2$. This gas tube will then pass current in its anode circuit if, and only if, the condenser $C_1$ has theretofore been charged to a voltage of the polarity indicated by the "plus" and "minus" on the drawing, due to a previous signal. The ignition of the gas tube $G_2$ will thus operate to discharge the condenser $C_1$ as long as the gas tube $G_1$ is extinguished.

The application of the same positive impulse of $I_1$ to the input terminals of the delay network $D_1$ produces in the output circuit of this network a similar current impulse $I_2$, slightly delayed with respect to the current impulse $I_1$. See curves $I_1$ and $I_2$ of Fig. 8. This delay is to be adjusted to a value sufficient to permit the substantial discharge of condenser $C_1$ and the subsequent extinction of the gas tube $G_2$. Upon the occurrence of the delayed positive pulse $I_2$, the control grid of the gas tube $G_1$ is raised above its cut-off voltage as determined by the potential of the anode battery $B_1$ and the grid battery $B_2$. Thereupon the gas tube $G_1$ is ignited and current from the battery $B_1$ flows through the network $N_1$, through the anode-cathode circuit of the gas tube $G_1$ and thence to recharge the condenser $C_1$.

In accordance with the invention this recharging takes place preferably at a substantially constant rate and endures for a certain specified time to be discussed hereinafter. The constancy of the charging rate may be achieved, as is well-known in the art, by adjusting the relative magnitudes of the parameters of the circuit so that the impedance offered by the condenser $C_1$ to the electromotive force of the battery $B_1$ is a comparatively small part of the impedance of the circuit as a whole. Thus, if the network $N_1$ is merely a high resistance, or if the anode-cathode resistance of the gas tube $G_1$ is high, this result will be attained, at least over a comparatively short time, which may, in a practical case, be sufficient. If greater constancy of charging rate is desired than is obtainable with a simple linear resistor for the network $N_1$, a more complex circuit arrangement may be employed. With a simple resistor the condenser charge will accumulate along an exponential curve, as is well-known. The charge-time curve may be made substantially linear over considerable lengths of time by employing, for the network $N_1$, a circuit arrangement including a non-linear resistor whose resistance varies in a prescribed manner in accordance with the voltage across it. Again, if desired, a feedback control circuit may be employed in which an auxiliary signal, directly proportional to the voltage on the condenser $C_1$, is caused to control its charging rate in such a way that it remains substantially constant over a considerable length of time. Any desired circuit arrangement may be employed for this purpose and, furthermore, it is to be regarded as a refinement and not a necessity because minor departures of the charging rate from constancy do not seriously degrade the quality of the reproduced copy.

The charging rate of the condenser $C_1$ is determined by the parameters of the charging circuit. The charging commences at the instant at which the first positive pulse of $I_2$ occurs and the gas tube $G_1$ is ignited, and continues until the gas tube $G_1$ is extinguished. This takes place when the anode of the gas tube $G_1$ is driven below cut-off by a pulse of voltage in the secondary winding of the transformer $T_3$, which is due to a "negative" current pulse in its primary winding; i. e., a pulse corresponding to a negative or black-to-white transition of the copy. This pulse $I_3$ occurs upon the arrival of the first negative transition of the current $I_0$, and flows through the second secondary circuit of the transformer $T_1$ but is prevented by the rectifier $Re_1$ from affecting any of the components of the first secondary circuit of the transformer $T_1$.

The successive operations of the system as thus far described are graphically depicted in Fig. 8 wherein the curve A represents a typical portion of the copy being scanned having alternate light and dark areas. Unlike the system of Figs. 1 to 5, inclusive, there is no restriction on the dark areas that they be nearly alike in duration, and departure of the copy from the form preferred for use with the embodiment first described does not produce degradation when the apparatus of Figs. 6 and 7 is employed.

Curve $I_0$ of Fig. 8 shows the conventional (inverted) image signal derived from scanning the copy areas of curve A. The curve $I_1$ shows the positive pulses of current which occur on positive transitions of the current $I_0$ and flow in the first-named secondary circuit of the transformer $T_1$. The curve $I_2$ shows the positive pulses derived from the positive pulses of curve $I_1$ which are slightly delayed with respect thereto. The curve $I_3$ shows the pulses which flow in the second-named secondary circuit of the transformer $T_1$ which occur on the negative transitions of the current $I_0$, corresponding to transitions from dark to light on the copy. The curve $V_1$ shows the voltage on the condenser $C_1$ which, as above stated, starts charging upon the occurrence of each pulse of $I_2$, stops charging and holds its charge upon the occurrence of each pulse of $I_3$ and is again discharged on the occurrence of each pulse of $I_1$. Inspection of the curve $V_1$ shows that in each case the magnitude of the charge is proportional to the length of the dark area of the copy whereas the duration of the charge is approximately equal to the duration of a copy area pair, as above defined, i. e., the duration of a dark area and the following light area.

This sequence of intermediate signals $V_1$, could, if preferred, be transmitted to the receiver station without alteration of form. However, it is preferred to reverse the polarity of alternate signals of this sequence as shown by the curve $V_2$ in Fig. 8 prior to transmission in order that it may be less subject to degradation in the course of transmission. The reason is that a transmission channel whose range of transmitted frequencies is limited as, for example, is the case with a composited telegraph circuit, would transmit the slowly alternating voltage $V_2$ without excessive distortion but would not pass the interruptions in the direct wave $V_1$, because they occur at twice the rate of those of the wave $V_2$. To this end, the circuit arrangement shown at the right-hand part of Fig. 6 is employed and of which a detailed description was earlier postponed. This circuit comprises two main portions, in particular a first or signal path portion comprising two vacuum tubes $VT_1$ and $VT_2$ having resistors $R_3$, $R_4$, $R_5$ and $R_6$ connected in their anode circuits in the manner shown, and resistors $R_1$ and $R_2$ connected in their grid circuits. The second main portion of this circuit arrangement is a feedback network which applies to the control grid of each of the tubes, for example, $VT_2$, a portion of a voltage derived from the output current of the other tube, for example, $VT_1$, in a manner to paralyze one tube while the other is acting as an amplifier, and to change the conditions of paralysis and activity upon the occurrence of each new signal of the sequence; i. e., each time the voltage $V_1$ drops to zero.

The detailed description of the operation of this feedback network will be again postponed, and the operation of the main signal path portion of the circuit will be first described on the assumption that the feedback circuit operates as intended. Thus, with this circuit arrangement, only one of the tubes $VT_1$ or $VT_2$ can be active at a time, and it remains active, despite the presence of a signal applied to the control grid of the other tube, until after the first tube has been deactivated and paralyzed by the removal of the signal applied to its control grid. Thus, let it be assumed that the tube $VT_2$ has been deactivated. The first rise of the voltage $V_1$ of the condenser $C_1$ is applied to the control grids of both tubes in parallel, but only the tube $VT_1$ delivers an output current. The amplified output voltage which appears across the resistors $R_3$, $R_5$ and therefore on the output transmission line 23, will be substantially proportional to the voltage applied to the grid circuit of this tube, namely, to the voltage $V_1$. This is indicated in the curve $V_2$. However, upon discharge of the condenser $C_1$ a pulse is fed back from the resistor $R_3$ in the anode circuit of the tube $VT_1$ to the resistor $R_2$ and appears as a positive voltage pulse on the grid of the tube $VT_2$. This places this tube in active condition, and a small surge of current passes through it. This is sufficient to send a feedback voltage, derived from the resistor $R_4$ to the resistor $R_1$ to render the tube $VT_1$ inactive, so that, as the condenser $C_1$ is recharged with the next voltage signal of the curve $V_1$, it is the tube $VT_2$ which amplifies this next signal while the tube $VT_1$ remains inactive. With the output resistors $R_5$ and $R_6$ connected, as shown, there results a voltage on the transmission line 23 whose signal cycles are alternately inverted with respect to the condenser voltage $V_1$. This alternating inversion of the voltage $V_1$ is illustrated in the curve $V_2$.

Coming now to a description of the feedback circuit, a transformer $T_6$ is provided, its primary winding being connected by way of a resistor $R_7$ to the terminals of the resistor $R_3$ in the anode circuit of the tube $VT_1$ and its secondary winding being connected by way of a resistor $R_8$ to the terminals of the resistor $R_2$ in the grid circuit of the vacuum tube $VT_2$. The windings should be so poled that a positive voltage input to the transformer $T_6$, for example, corresponding to the rising portion of the curve $V_1$ of Fig. 8, applies a negative voltage to the grid of the tube $VT_2$ in opposition to any positive voltage on condenser $C_1$. During an increase in the voltage $V_1$, and assuming that the amplifier tube $VT_1$ is active, its anode current exhibits a substantially constant rate of increase. This anode current flows through the resistor $R_3$ and the primary winding of the transformer $T_6$ in parallel. With proper apportionment of the impedances of these elements, the primary winding current increases at a substantially constant rate. Thus, there is generated in the secondary winding of this transformer, and therefore applied to the control grid of the tube $VT_2$, a substantially constant electromotive force. The transformer windings should be so connected to the terminals of the resistor $R_2$ that this voltage is negative, and the turns ratio of the transformer $T_6$ should be such that the magnitude of this voltage is sufficient to hold the tube $VT_2$ below its cut-off point despite the application of the voltage of the signal $V_1$ to its control grid.

A high frequency oscillator $O_1$ is provided, which supplies high frequency alternating current by way of a conventional hybrid coil H, provided with a terminal network Z, to the grid-cathode circuit of an amplifier tube $VT_3$. The grid-cathode circuit includes a source $B_6$ of steady bias, sufficient to hold the tube $VT_3$ non-conductive to the oscillations of the source $O_1$ in the absence of a signal $V_1$. The resistor $R_3$ is also included in the circuit and the voltage drop across $R_3$ due to the plate current in $VT_1$ has such a polarity that when the output current of the tube $VT_1$ reaches a fair value, the biasing effect of the source $B_6$ is overcome, and the tube $VT_3$ becomes conductive to the oscillations. The anode of the tube $VT_3$ is coupled by way of a transformer $T_8$, to a full wave rectifier $Re_4$, a low pass filter $F_1$ and a resistor $R_{11}$ to the terminals of the resistor $R_2$ in the grid circuit of the tube $VT_2$. The polarity of the rectifier $Re_4$ is so chosen that the resulting voltage applied to the grid of the tube $VT_2$, derived from the amplification and rectification of the output of the oscillator $O_1$, is negative. This negative voltage supplements that derived directly from the output of the tube $VT_1$ and delivered by way of the transformer $T_6$ to the grid of the tube $VT_2$, during the period of the increasing of the voltage $V_1$.

When the voltage $V_1$ ceases to rise, and remains constant as above described at a value proportional to the duration of the dark area scanned, the feedback voltage derived from the transformer $T_6$ is no longer effective to block the tube $VT_2$, but the voltage derived from amplification and rectification of the oscillator output continues to be as effective as before. Thus the tube $VT_2$ remains paralyzed, despite the application of signal voltages to its grid, while the tube $VT_1$ amplifies the signal voltage $V_1$ and an amplified replica thereof appears on the transmission line 23, until such time as the voltage $V_1$ falls to zero, at the conclusion of the first full signal of this sequence, as hereinabove described. Thereupon the anode current of the tube $VT_1$ ceases to flow, so that the portion of the grid bias voltage of the tube $VT_3$ which was derived from the anode current voltage drop in the resistor $R_3$ ceases to exist. The voltage of the bias source $B_6$ now becomes controlling so that the tube $VT_3$ no longer passes signals from the oscillator $O_1$. Thus the paralyzing signals are removed from the control grid of the tube $VT_2$. At the same time, the abrupt fall of the signal voltage $V_1$ to zero and the consequent sudden decay of the anode current of the tube $VT_1$ produces a pulse of reverse polarity through the transformer $T_6$, thus delivering a pulse of positive voltage to the grid of the tube $VT_2$. This tube is now able to receive the voltage of the ensuing signal of the sequence $V_1$ and amplify it, in the same fashion that the tube $VT_1$ amplified the first signal. A feedback network which is similar to the one just described is associated with the tube $VT_2$, for supplying a paralyzing bias and an activating pulse to the tube $VT_1$. As soon as this tube $VT_2$ becomes active, a portion of its output current, flowing through the primary winding of a transformer $T_7$, delivers a substantially constant negative bias voltage to the resistor $R_1$ and so to the grid of the tube $VT_1$. At the same time the voltage of the oscillator $O_1$ is delivered by way of the hybrid coil H to the grid of the amplifier $VT_4$, and the signal voltage across the resistor $R_4$ is likewise applied to the control grid of the tube $VT_4$ to overcome the bias of the battery $B_7$. As a result, the tube $VT_4$ amplifies the oscillator output. This is applied by way of the transformer $T_9$, the rectifier $Re_5$, the filter $F_2$ and the resistor $R_{12}$ to the grid circuit of the tube $VT_1$ to hold it negative and so maintain the paralysis of this tube until the anode current of the tube $VT_2$ shall abruptly fall to zero at the conclusion of the second signal of the sequence $V_1$. Thereupon the voltages applied to the grid of the tube $VT_1$ from the transformers $T_7$ and $T_9$ cease to be negative and, instead, a positive pulse is applied to the grid of the tube $VT_1$ for a short interval, whereupon the third signal of the sequence $V_1$ takes control, and the tube $VT_1$ conducts.

The resistors $R_3$ and $R_4$ should be of high impedance as compared with the transformers $T_6$ and $T_7$. They are included principally to clarify the anode current paths of the tubes $VT_1$ and $VT_2$. In practice they may, if desired, be entirely omitted, in which case the anode-cathode current path of the tube $VT_1$ will include the primary winding of the transformer $T_6$, the resistor $R_7$, the resistor $R_5$, and the potential source $B_5$, the anode-cathode current path of the tube $VT_2$ being similar.

The resistors $R_7$ and $R_9$ are included merely to prevent the primary windings of the transformers $T_6$ and $T_7$, respectively, from short-circuiting direct voltages which appear across the resistors $R_3$ and $R_4$. The inherent resistance of the primary windings of the transformers $T_6$ and $T_7$ may well be sufficient for this purpose.

The resistors $R_8$ and $R_{11}$ constitute a combining pad to prevent short-circuiting of the output of the rectifier $Re_4$ by the secondary winding of the transformer $T_6$. These resistors also serve to partially isolate the filter $F_1$ from the circuit of the positive pulse which occurs when the voltage $V_1$ abruptly falls to zero, so that this pulse shall not be too greatly changed by the reactance of the low-pass filter. The same remarks apply to the resistors $R_{10}$ and $R_{12}$, with respect to the transformer $T_7$, the rectifier $Re_5$, and the filter $F_2$.

In Fig. 6, each of the gas tubes and vacuum tubes is shown as being provided with its own grid bias battery and its own plate and filament supply batteries, as well as its own input circuit. It is, of course, possible to make wide variations in these details in accordance with well-known practice. Heater-cathode tubes may be employed as desired.

A switch $S_3$ is provided for grounding the midpoint of the inverting amplifier at the transmitter, if desired. This tends to balance the line 23 to ground and therefore to reduce the amount of pick-up of stray voltages and the consequent noise. Many other modifications may be made to effect economies of apparatus or improve the characteristics of the system without departing from the principles of the invention.

Fig. 7 shows receiver apparatus adapted to decipher the received signals (curves $V_1$, $V_2$ of Fig. 8) and to reproduce the transmitted copy therefrom. This figure will be explained in terms of the received line signal sequence having the form of the curve $V_2$, it being understood that, if on receipt of the signals at the receiver station, they are seriously rounded, they may be squared up in accordance with well-known techniques or if the distortion is not serious they may be utilized as received, the result being the same as though they had the form of the signals of the curve $V_2$ but very slightly delayed with respect thereto.

Referring now in detail to Fig. 7, the incoming signals may be conceived of as arriving on the transmisison line 30 where, after such amplification as may be desired, they are next applied to a full wave rectifier $Re_6$ which serves to reinvert, without otherwise changing, all of the negative signals of the incoming signal sequence, while leaving the positive signals unchanged. The rectifier may be of any desired type, the bridge-connected arrangement of dry plate units, which is well known, being suitable.

The output circuit of the rectifier consists principally of two resistors $R_{13}$ and $R_{14}$, connected in series. These resistors are preferably of comparatively low resistance in order that current in the remainder of the circuit to be described shall not substantially modify the rectifier current output.

The primary winding of a transformer $T_0$ is connected across the resistor $R_{13}$, the secondary winding being connected to the control grid and by way of a biasing battery $B_8$ to the cathode of a gas discharge device $G_6$. The anode of the gas tube $G_6$ is connected to one (negative) terminal of a condenser $C_3$ and to the cathode of another gas tube $G_8$.

The positive terminal of the condenser $C_3$ is connected by way of a resistor $R_{15}$ to the control grid of a gas tube $G_7$ whose cathode is returned, through the resistor $R_{14}$ and a grid bias battery $B_9$ to the negative terminal of the condenser $C_3$. The anode of this tube is connected by way of the primary winding of a transformer $T_{10}$ and an oscillator $O_2$ to its cathode. This transformer $T_{10}$ is provided with two similar secondary windings, one of which is connected by way of a bias battery to the cathode and control grid of a gas tube $G_9$ and the other of which is similarly connected by way of a bias battery to the cathode and control grid of another gas tube $G_8$. The anodes of these two gas tubes $G_9$ and $G_8$ are connected together and to the positive terminal of the condenser $C_3$. The cathode of the gas tube $G_9$ is connected by way of an oscillator $O_3$ and thence by way of a resistor $R_{16}$ to its anode and to the positive terminal of the condenser $C_3$. This cathode is also connected by way of the oscillator $O_3$, a load impedance 67 and a source of operating potential $B_{10}$ to the cathode of the tube $G_6$.

The load impedance 67 may be of any type suitable for copy reproduction. For example, it may comprise the moving element of an oscillograph here shown as comprising a source of light 65, a vibratory mirror 66, the actuating coil 67, a lens 68 by which light rays from the source 65 after reflection by the mirror 66 are brought to a focus on a receiver drum 2', which may be similar in all respects to the receiver drum of Fig. 2 and may be similarly driven. Between the vibratory mirror 66 and the lens 68 there may be placed a light intercepting screen 69 having an opening 70 therein through which the light rays may pass when the element 67 is energized, the screen 69 cutting them off when the element 67 is not energized.

It will be understood by those skilled in the art that the various operating potential supplies, indicated on the drawing as batteries, may be provided by any suitable means, that cathodes which are independent of the cathode heating elements may be employed instead of the filamentary cathodes shown, that tubes may be employed having various auxiliary grids, properly supplied with potential, and other similar modifications in the details of the circuit may be employed without in any way modifying its operation as hereinafter described.

In operation, as a signal sequence, depicted as the curve $V_2$ of Fig. 8, arrives on the incoming transmission line 30, it is restored by the rectifier $Re_6$ into the signal sequence form represented by the curve $V_1$, and appears as a voltage drop across the resistors $R_{13}$ and $R_{14}$. The characteristics of the transformer $T_9$ are adjusted in well-known manner so that the voltage which appears across the output terminals of its secondary winding has a wave form consisting of a sharp positive pulse each time the rectified signal ($V_1$) falls to zero, followed by a substantially constant negative value during the time throughout which the signal rises at a constant rate, as above described. This wave form is represented in Fig. 8 as $V_4$.

The initial surge of the voltage $V_4$ places a momentary positive voltage peak on the grid of the gas tube $G_6$. The biasing source $B_8$ is so adjusted that any positive voltage acting between the cathode and the grid will cause the cathode-anode path of the tube $G_6$ to become conductive. Therefore, whenever the current incoming on the line 30 falls suddenly to zero, the tube $G_6$ fires. The resistor $R_{16}$ is of high resistance in comparison with other impedances in the cathode-anode circuit, so that when firing takes place, the current which flows in this circuit due to the anode voltage source $B_{10}$ is substantially constant until the tube $G_6$ is extinguished as described hereinafter. This substantially constant current charges the condenser $C_3$ with the polarity indicated in the figure. The condenser is preferably of large capacitance, in order that the voltage to which it is charged shall never become more than a small fraction of the total voltage drop in the cathode-anode circuit of the tube $G_6$. This precaution assists in maintaining constancy of the charging current and so in charging the condenser $C_3$ at a substantially constant rate. The substantially constant charging rate of the condenser $C_3$ results in a condenser voltage $E_5$ (Fig. 8) which increases positively in magnitude at substantially the same constant rate. This voltage is impressed, through the resistor $R_{15}$, on the control grid of the tube $G_7$ in opposite phase to the voltage $V_1$ appearing across the resistor $R_{14}$. Thus the voltage impressed on the control grid of the tube $G_7$ is in effect the difference between the voltages $E_5$ and $V_1$. By proper selection of the values of the anode source $B_{10}$ and the resistors $R_{13}$, $R_{14}$ and $R_{15}$ these two voltages may be made substantially equal in magnitude during the period of the condenser charge. As above stated, they are opposite in sign. Therefore, during this time, the voltage impressed on the grid of the tube $G_7$ due to the received signal is substantially zero.

At a time corresponding to the time at which the voltage $V_1$ at the transmitter ceases to increase and becomes constant, the tube $G_6$ is extinguished in the manner described below. However, this does not occur until the apparatus yet to be described has had time to act, and therefore the voltage impressed on the tube $G_7$ from the resistor $R_{14}$ which is directly related to the received voltage $V_1$ ceases to rise and becomes flat before the voltage $E_5$ ceases to rise. Therefore, at the instant at which the voltage $V_1$ ceases to rise and become flat, the control grid of the tube $G_7$ is driven to a positive value by the continuing increase of the condenser voltage $E_5$. The biasing source $B_9$ and the amplitude of the voltage of the oscillator $O_2$ are so adjusted that a very small increase in the control grid voltage will cause the tube $G_7$ to fire. This occurs on a positive half cycle of the voltage of the oscillator $O_2$ and sends a sharp surge of current through the primary winding of the transformer $T_{10}$, thus inducing voltages and in the secondary windings of this transformer and impressing these voltages on the control grids of tubes $G_8$ and $G_9$.

The positive control grid voltage pulse on the tube $G_9$ causes momentary ignition of this tube during a positive half cycle of the voltage of the oscillator $O_3$. The next half cycle of this oscillator causes the tube $G_9$ to be extinguished. By the time the following positive half cycle occurs, the grid voltage surge has ceased so that the tube $G_9$ is ignited only for one-half cycle of the oscillator voltage. This momentary ignition of the tube causes a sharp surge of current to flow in the cathode-anode circuit of this tube which includes the resistor $R_{16}$ which, as above stated, has a high value. The values of this resistor $R_{16}$ and of the voltage of the oscillator $O_3$ are so adjusted that during its brief current surge the voltage across the resistor $R_{16}$ outweighs the voltage of the anode source $B_{10}$ so that, the voltage on the grid of the tube $G_6$ being no longer positive, the tube $G_6$ is extinguished. Extinction of this tube causes charging of the condenser $C_3$ to cease and, as above stated, the condenser voltage now remains momentarily at a constant value which is proportional to the length of time during which the condenser $C_3$ was being charged. This, in turn, as described above in conjunction with Fig. 5, is proportional to the duration of a dark area of the transmitted copy.

The positive surge in the grid circuit of the tube $G_8$ renders the cathode-anode circuit of this tube conductive. The only source of anode voltage in the anode circuit of this tube, when tube $G_6$ is extinguished, is the charged condenser $C_3$. Therefore this condenser rapidly and immediately discharges through the cathode-anode circuit of the tube $G_8$, thus reducing the control grid voltage on the tube $G_7$ past cut-off so that, on the next half cycle of the voltage of the oscillator $O_2$, this tube is not reignited. The wave form of the control grid voltage of tube $G_7$ is shown on Fig. 8 as $E_6$.

As a consequence of the actions above described, the voltage $E_5$ of condenser $C_3$ rises at a substantially constant rate for a time very slightly greater than the time during which the received signal $V_1$ or $V_2$ increases, positively or negatively, at a constant rate. At the conclusion of this time the voltage suddenly drops to zero. As above described, during the charging period, the charging current $I_8$ flows in the cathode-anode circuit of the tube $G_6$ and through the sensitive element 67, causing deflection of the mirror 66 to a position such that light from the lamp 65 passes through the aperture 70 and exposes the film 1'. At the conclusion of the charging time, the light beam is deflected to a position at which the screen 69 intercepts it. Thus exposure takes place during successive times which are substantially proportional to the magnitudes of the pulses of the incoming signal sequence, and independent of their polarity. This results in exposure of the photographically sensitive film or paper in a manner to reproduce the copy being transmitted, as indicated in curve J' of Fig. 8.

Various modifications, both of components and of their arrangement and organization, may be made without departing from the inventive spirit and principle of utilizing characteristics of the copy to be transmitted in order to reduce, without serious degradation of the reproduction, the signaling speed, and therefore to effect economy either of transmission apparatus or of transmission time.

What is claimed is:

1. In an image signal transmission system, means for scanning successive line series of elemental areas of two-tone copy to produce a sequence of image signals, each signal of said sequence corresponding to a scanned area of one-tone value, means for deriving from said sequence an intermediate signal sequence, each signal corresponding to a pair of adjacent copy areas of unlike tone values, means for transmitting said intermediate signal sequence to a receiver station, and, at said receiver station, means responsive to each transition of said intermediate signal sequence for initiating a reproduction signal pulse, means for thereafter terminating said pulse prior to the inception of the ensuing pulse, said pulses constituting a reproduction signal sequence, image reproducing means, and means for actuating said reproducing means by said reproduction signal sequence.

2. In an image signal transmission system, means for scanning successive line series of elemental areas of two-tone copy to produce a sequence of image signals, each signal of said sequence corresponding to a single scanned area, means for deriving from said sequence an intermediate signal sequence, each signal corresponding to a pair of adjacent copy areas of unlike tone values and having a duration equal to the duration of the image signals derived from said pair, means for transmitting said intermediate signal sequence to a receiver station, and, at said receiver station, means responsive to each transition of said intermediate signal sequence for initiating a reproduction signal pulse, means for thereafter terminating said pulse prior to the inception of the ensuing pulse, said pulses constituting a reproduction signal sequence, image reproducing means, and means for actuating said reproducing means by said reproduction signal sequence.

3. In an image signal transmission system, means for scanning successive line series of elemental areas of two-tone copy to produce a sequence of image signals, each signal of said sequence corresponding to a single scanned area, means for deriving from said sequence an intermediate signal sequence, each signal corresponding to a pair of adjacent copy areas of unlike tone values and having a duration equal to the duration of the image signals derived from said pair and having another characteristic related to the duration of a particular member of said pair, means for transmitting said intermediate signal sequence to a receiver station, and, at said receiver station, means responsive to each transition of said intermediate signal sequence for initiating a reproduction signal pulse, means for thereafter terminating said pulse prior to the inception of the ensuing pulse, said pulses constituting a reproduction signal sequence, image reproducing means, and means for actuating said reproducing means by said reproduction signal sequence.

4. In an image signal transmission system, means for scanning successive line series of elemental areas of two-tone copy to produce a sequence of image signals, each signal of said sequence corresponding to a single scanned area, means for deriving from said sequence an intermediate signal sequence, each signal corresponding to a pair of adjacent copy areas of unlike tone values and having a duration equal to the duration of the image signals derived from said pair and having another characteristic related to the duration of a particular member of said pair, and means for transmitting said intermediate signal sequence to a receiver station for reproduction thereat of said copy.

5. In an image signal transmission system, means for scanning successive line series of elemental areas of two-tone copy to produce a sequence of image signals, each signal of said sequence corresponding to a single scanned area, means for deriving from said sequence an intermediate signal sequence, each signal corresponding to a pair of adjacent copy areas of unlike tone values, and means for transmitting said intermediate signal sequence to a receiver station for reproduction thereat of said copy.

6. In a system for deriving facsimile signals from black and white copy, a plurality of distinct communication channels, means for producing in one of said channels a first sequence of signals having transitions corresponding only to points of the copy at which black follows white, means for producing in another of said channels a second sequence of signals having transitions corresponding only to points of the copy at which white follows black, means for delaying one of said signal sequences to bring its transitions into approximate coincidence with the transitions of said other sequence, and means for combining the signals of said delayed sequence with the signals of said undelayed sequence to form a composite signal suitable for economical transmission.

7. Apparatus as defined in claim 6 wherein said signal-combining means comprises means for arithmetically adding the instantaneous values of said delayed signal to the instantaneous values of said undelayed signal.

8. Apparatus as defined in claim 6, wherein said signal combining means comprises a circuit arrangement which is similarly responsive to the presence of a signal of either of said sequences and doubly responsive to the simultaneous presence of signals of both of said sequences.

9. Apparatus as defined in claim 6 wherein said signal combining means comprises a source of voltage, terminal apparatus, means for applying the voltage of said source to said terminal apparatus, means responsive to the presence of a signal of one of said sequences for reversing the polarity of the voltage applied to said apparatus without affecting its magnitude and means responsive to the presence of a signal of the other of said sequences for altering the magnitude of the voltage applied to said apparatus without affecting its polarity.

10. In a system for reconstituting a replica of two-tone copy scanned at a transmitter station from a received sequence of signals each of which corresponds to a pair of adjacent scanned copy areas of unlike tone values, means responsive to each transition of said received signal sequence for initiating a reproduction signal pulse of preassigned polarity, means for thereafter terminating said pulse prior to the inception of the ensuing pulse, said pulses constituting a reproduction signal sequence, image reproducing means, and means for actuating said reproducing means by said reproduction signal sequence.

11. In a system for reconstituting a replica of two-tone copy scanned at a transmitter station from a received sequence of signals, each of which corresponds to a pair of adjacent scanned copy areas of unlike tone values, means responsive to each transition of said received signal sequence for initiating a reproduction signal pulse of preassigned polarity, means for terminating said pulse after the lapse of a preassigned time interval, said interval being substantially equal to the time required at the transmitter station to scan a signal dark area of standard length, said pulses constituting a reproduction signal sequence, image reproducing means, and means for actuating said reproducing means by said reproduction signal sequence.

12. In a system for reconstituting a replica of two-tone copy scanned at a transmitter station from a received sequence of signals, alternating in polarity, each of said signals corresponding to a pair of adjacent scanned copy areas of unlike tone values, means responsive to each transition of said received signal sequence for initiating a reproduction signal pulse of preassigned polarity, the polarity of said pulse being independent of the polarity of said transition, means for thereafter terminating said pulse prior to the inception of the ensuing pulse, said pulses constituting a reproduction signal sequence, image reproducing means, and means for actuating said reproducing means by said reproduction signal sequence.

13. In an image signal transmission system, a field to be transmitted comprising an arrangement of areas of one tone value separated by areas of another tone value, means for producing a sequence of signals of alternating polarity, each of said signals having an amplitude related to the tone value of an area of said field and a duration related to the combined lengths of said area and an adjacent area of the other tone value, means for transmitting said signals to a receiver station, and at said receiver station means for reconstituting a replica of said field from said signals.

14. In a system for transmitting facsimile signals from two-tone copy, a condenser, means for discharging said condenser at an instant corresponding to a point of said copy at which an area of a first tone value follows an area of a second tone value, means for thereafter immediately initiating the charging of said condenser, means for causing said charging to proceed at a substantially constant rate for a time corresponding to the length of said area of the first tone value, means for terminating said charging at an instant corresponding to a point at which an area of the second tone value follows said area of the first tone value, means for holding the charge for a time corresponding to the length of said area of the second tone value, means for repeating said discharge, charging and charge-holding for each copy area pair, and means for deriving from the resulting varying condenser charge a signal suitable for transmission.

15. In an image signal transmission system, means for scanning successive line series of elemental areas of two-tone copy to produce a sequence of image signals, each signal of said sequence corresponding to the scanning of an area of one tone resulting in adjacent signals being of different tones, and means for deriving from said sequence an intermediate sequence of area-pair signals for transmission, each signal of said intermediate sequence comprising a portion of uniform slope corresponding to the first area of said pair and a portion of uniform height corresponding to the second area of said pair.

16. In apparatus for reconstituting a replica of two-tone copy means producing a sequence of area pair signals, each signal of said sequence having a portion of uniform slope corresponding to one area of a copy area pair and a portion of uniform height corresponding to the second area of said pair, a condenser, means for charging said condenser through one current path at a substantially constant rate throughout the persistence of the uniform slope portion of each signal of said sequence received from said source, means for thereafter discharging said condenser through another current path, and a current-sensitive image-reproducing element in said first current path.

17. Apparatus as defined in claim 14 wherein said transmission signal deriving means comprises means for producing a voltage of one polarity proportional to one condenser charge of said sequence and for producing a voltage of opposite polarity proportional to the ensuing condenser charge of said sequence.

18. The method of two-tone copy facsimile transmission which comprises scanning said copy to derive an image signal sequence, deriving from said image signal sequence a sequence of intermediate signals, each of said signals commencing with the start of scanning an area of one tone value and terminating with the start of scanning of the next area of said tone value, transmitting said intermediate signal sequence to a receiver station, producing a sequence of reproduction signal pulses, each of which commences with the transition of said intermediate signals, terminating each of said pulses after the lapse of a fixed time interval, and reproducing an image in proportion to the signal values of said reproduction pulse sequence.

19. The method of deriving transmission signals from scanned two-tone copy which comprises producing in one channel a first sequence of signals having transitions corresponding only to points of the copy at which black follows white, producing in another of said channels a second sequence of signals having transitions corresponding only to points of the copy at which white follows black, delaying one of said signal sequences to bring its transitions into approximate coincidence with the transitions of said other sequence, and combining the signals of said delayed sequence with the signals of said undelayed sequence to form a composite transmission signal.

20. In the art of reconstituting two-tone copy copy scanned at a transmitter station from a received sequence of signals each of which corresponds to a pair of adjacent scanned copy areas of unlike tone values, the method which comprises initiating a reproduction signal pulse of preassigned polarity upon the occurrence of each transition of said received signal sequence, terminating each of said pulses after the lapse of a fixed time interval and prior to the inception of the ensuing pulse, and reproducing an image whose tone values are proportional to the magnitudes of said pulses.

21. Signal translating apparatus adapted to reverse the polarity of alternate signals of a received signal sequence and translate them without other change of character while translating intervening signals of said sequence with no change in character which comprises a pair of translating devices having input terminals and output terminals, the input terminals of each of said devices including a control electrode, an input signal sequence source, the input terminals of both of said devices being connected in parallel to said source, a translated signal utilization circuit, said output terminals being connected to said utilization circuit in push-pull arrangement, a feedback network interconnecting an output terminal of each of said devices with the control electrode of the other of said devices, said network comprising means responsive to the presence of current in the output circuit of each of said devices for holding the other of said devices in a state of inactivity, thus paralyzing each of said devices while the other is translating the current of a signal of the sequence, and means responsive to an abrupt decay of the translated current of each of said devices for applying an activating voltage to the control electrode of the other of said devices upon the completion of said signal, thus placing it in condition to translate the ensuing signal and to initiate paralysis of the first-named device.

22. Signal translating apparatus adapted to reverse the polarity of alternate signals of a received signal sequence and translate them without other change of character while translating intervening signals of said sequence with no change in character which comprises a pair of translating devices having input terminals and output terminals, the input terminals of each of said devices including a control electrode, an input signal sequence source, the input terminals of both of said devices being connected in parallel to said source, a translated signal utilization circuit, said output terminals being connected to said utilization circuit in push-pull arrangement, a feedback network interconnecting an output terminal of each of said devices with the control electrode of the other of said devices, said network comprising means responsive to the presence of current in the output circuit of each of said devices for holding the other of said devices in a state of inactivity, thus paralyzing each of said devices while the other is translating the current of a signal of the sequence, and means responsive to the termination of the signal current of each of said devices for applying an activating voltage to the control electrode of the other of said devices upon the completion of said signal, thus placing it in condition to translate the ensuing signal and to initiate paralysis of the first-named device.

23. Signal translating apparatus adapted to reverse the polarity of alternate signals of a received signal sequence and translate them without other change of character while translating intervening signals of said sequence with no change of character which comprises a source of a signal sequence, a pair of space discharge devices having their cathode-control electrode circuits connected in parallel and their cathode-anode circuits connected in push-pull arrangement, a signal input circuit for applying signals from said source to the control electrodes of said devices simultaneously, a signal output circuit comprising the anodes of both of said devices, and a feedback path from the anode circuit of each of said devices to the control electrode of the other of said devices, said path comprising means responsive to the presence of current in the anode circuit of each of said devices for biasing the other of said devices past its cut-off point, thus paralyzing each of said devices while the other is conducting the current of a signal of the sequence, and means responsive to an abrupt decay of the anode current of each of said devices for applying a positive voltage surge to the control electrode of the other of said devices upon the completion of said signal pulse, thus rendering it conductive to the current of the ensuing signal of the sequence and initiating paralysis of the first-named device.

24. Signal translating apparatus adapted to reverse the polarity of alternate signals of a received signal sequence and translate them without other change of character while translating intervening signals of said sequence with no change of character which comprises a source of a signal sequence, a pair of space discharge devices having their cathode-control electrode circuits connected in parallel and their cathode-anode circuits connected in push-pull arrangement, a signal input circuit for applying signals from said source to the control electrodes of said devices simultaneously, a signal output circuit comprising the anodes of both of said devices, and a feedback path from the anode circuit of each of said devices to the control electrode of the other of said devices, said path comprising means responsive to the presence of current in the anode circuit of each of said devices for biasing the other of said devices past its cut-off point, thus paralyzing each of said devices while the other is conducting the current of a signal of the sequence, and means responsive to the termination of the signal anode current of each of said devices for applying a positive voltage surge to the control electrode of the other of said devices upon the completion of said signal, thus rendering it conductive to the current of the ensuing pulse signal of the sequence and initiating paralysis of the first-named device.

KENNETH W. PFLEGER.

REFERENCES CITED

The following references are of record in the file of this patent:

UNITED STATES PATENTS

| Number | Name | Date |
|---|---|---|
| 1,019,403 | Armstutz | Mar. 5, 1912 |
| 1,627,701 | Hall | May 10, 1927 |
| 1,809,664 | Angel | June 9, 1931 |
| 1,826,970 | Walker | Oct. 13, 1931 |
| 1,848,839 | Ranger | Mar. 8, 1932 |
| 1,910,556 | McFarland | May 23, 1933 |
| 2,175,388 | Gurley | Oct. 10, 1939 |
| 2,232,190 | Vance | Feb. 18, 1941 |
| 2,281,891 | Terry | May 5, 1942 |
| 2,321,611 | Moynihan | June 15, 1943 |
| 2,333,245 | Hansell | Nov. 2, 1943 |
| 2,349,810 | Cook | May 30, 1944 |
| 2,408,117 | Young | Sept. 24, 1946 |
| 2,430,547 | Anderson | Nov. 11, 1947 |
| 2,433,407 | Tahon | Dec. 30, 1947 |
| 2,446,635 | Cooley | Aug. 10, 1948 |
| 2,485,310 | Patremio | Oct. 18, 1949 |
| 2,488,314 | Moore | Nov. 15, 1949 |

OTHER REFERENCES

Electrical Experimenter, December 1917, pages 516 and 517.